(12) United States Patent
Abe

(10) Patent No.: US 7,340,326 B2
(45) Date of Patent: Mar. 4, 2008

(54) RECOVERY CONTROL METHOD FOR VEHICLE CONTROL SYSTEM

(75) Inventor: Takeshi Abe, Higashi-matsuyama (JP)

(73) Assignee: Bosch Corporation, Tokyo (JP)

( * ) Notice: Subject to any disclaimer, the term of this patent is extended or adjusted under 35 U.S.C. 154(b) by 0 days.

(21) Appl. No.: 11/281,557

(22) Filed: Nov. 18, 2005

(65) Prior Publication Data
US 2006/0085110 A1 Apr. 20, 2006

Related U.S. Application Data

(63) Continuation of application No. PCT/JP2004/006634, filed on May 17, 2004.

(30) Foreign Application Priority Data
May 20, 2003 (JP) ............................. 2003-142467

(51) Int. Cl.
G06F 7/00 (2006.01)
G06F 17/00 (2006.01)
G06F 11/00 (2006.01)

(52) U.S. Cl. ................................. 701/1; 701/35; 714/2

(58) Field of Classification Search .................... 701/1, 701/29–36, 99–115; 340/438, 439; 714/2, 714/5; 123/479, 480
See application file for complete search history.

(56) References Cited

U.S. PATENT DOCUMENTS 5,200,600 A * 4/1993 Shinagawa .................. 235/492
5,243,324 A * 9/1993 Bober ......................... 340/439
5,590,040 A * 12/1996 Abe et al. ..................... 701/35
5,745,864 A * 4/1998 Hosoe et al. .................. 701/35
6,167,338 A * 12/2000 De Wille et al. .............. 701/51
6,182,004 B1 * 1/2001 Komori ....................... 701/114
6,216,069 B1 * 4/2001 Goudie et al. ................. 701/36
6,615,119 B1 * 9/2003 Shimizu ...................... 701/29

FOREIGN PATENT DOCUMENTS

JP 7-175501 7/1995

\* cited by examiner

*Primary Examiner*—Jack Keith
*Assistant Examiner*—Edward Pipala
(74) *Attorney, Agent, or Firm*—Wenderoth, Lind & Ponack, L.L.P.

(57) ABSTRACT

An appropriate recovery process is made possible according to the situation of a power supply anomaly. When a system reset occurs, a storage unit stores an operation state of a system immediately before the reset in an operation state memory and also stores a recovery mode determined according to the stored operation state in a recovery mode memory. At the beginning of the recovery process, a necessary process is performed according to the stored recovery mode. Each time the recovery process is performed, a recovery counter performs enumeration and a normal-operation-time timer counter enumerates a normal operation time of the system. Such processes as a system halt and an engine recovery are performed according to the enumerated value and the normal operation time enumerated by the counters.

2 Claims, 5 Drawing Sheets

RECOVERY CONTROL METHOD FOR VEHICLE CONTROL SYSTEM

This is a continuation of International Application No. PCT/JP2004/006634, filed May 17, 2004.

BACKGROUND OF THE INVENTION

1. Field of the Invention

The present invention relates to a method of controlling an operation recovery for various electronic devices, apparatus, or the like when a system reset occurs because of an anomaly in the electronic devices, the apparatus, or the like. More particularly, the invention relates to a recovery control method for a vehicle control system.

2. Description of the Related Art

In an electronic control system, when a system reset is performed due to, for example, a power supply anomaly that triggers the system reset, it is desirable to quickly recover the state immediately before the anomaly occurred. An apparatus that is configured from this viewpoint is publicly known and well known. The apparatus is provided with a backup memory for storing various data related to operations of the system, and is configured so that it can distinguish the stored data between before an update of the stored data and after the update, to facilitate selection of the stored data necessary at the time of recovery and to make a smooth recovery process possible (for example, see JP-A-7-175501).

In such an apparatus, it is typical that a system halt or a system reset is performed once such an anomaly occurs in which power supply voltage becomes less than a predetermined reference voltage, for example. However, depending on the system, there are cases in which it may be convenient not to perform the system halt immediately when a power supply anomaly occurred only one time, with such a system that the power supply anomaly occurs a plurality of times with a cycle that is unique to the system. For example, with such an apparatus as a vehicle control system, an accurate recovery process according to the frequency of occurrence, the cycle of occurrence, and the like, of power supply anomalies is desired.

SUMMARY OF THE INVENTION

The present invention has been accomplished in view of the foregoing circumstances, and provides a recovery control method for a vehicle control system that enables an appropriate recovery process according to the situation of power supply anomalies.

According to an embodiment of the invention, there is provided a recovery control method for a vehicle control system, comprising:

sequentially storing operation states of the vehicle control system; referencing the stored content at a time of starting the vehicle control system; and, if it is determined that a previous system operation has not ended normally, performing a recovery process in a recovery mode that has been determined in advance according to an operation state of the system operation immediately before the termination.

When performing a recovery process, it is made possible with such a configuration to reference a system operation immediately before the power supply anomaly occurs that triggered the recovery process, and moreover, to select a recovery process that is determined according to the system operation. Therefore, an appropriate recovery process can be performed quickly according to the situation of the anomaly.

DETAILED DESCRIPTION OF THE PREFERRED EMBODIMENTS

Hereinbelow, an embodiment of the invention is explained with reference to FIGS. 1 through 5.

It is to be understood that the members, arrangement, and so on explained below are not to limit the present invention, and various changes and modifications can be made within the sprit and scope of the present invention.

Figure 1:
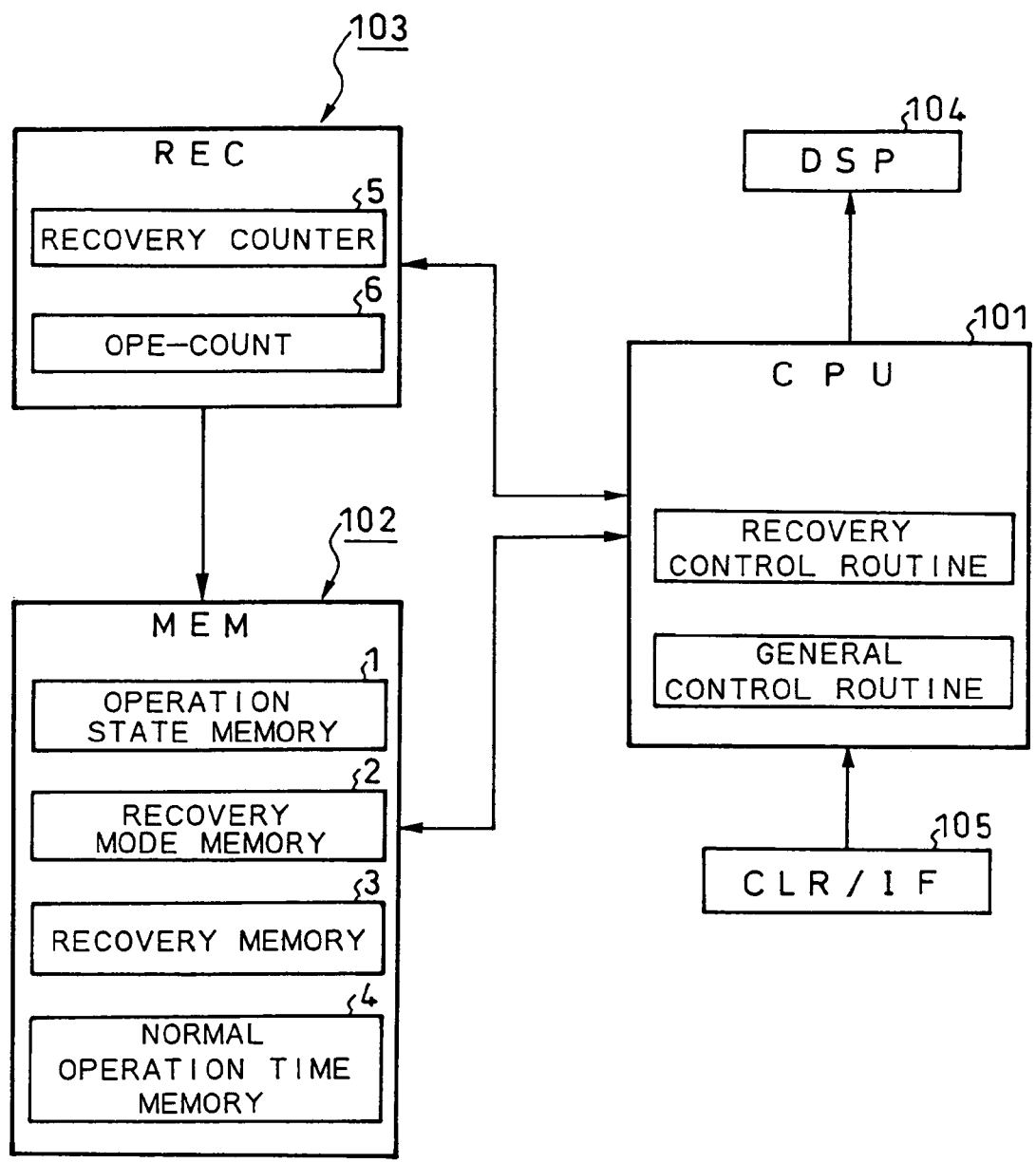
FIG. 1 is a configuration diagram illustrating a configuration example of a vehicle control system according to an embodiment of the invention.

First, a configuration example of the vehicle control system in a preferred embodiment of the invention is described with reference to FIG. 1.

This vehicle control system comprises, as its main components, a control unit (denoted as "CPU" in FIG. 1) 101, a storage unit (denoted as "MEM" in FIG. 1) 102, a recovery circuit (denoted as "REC" in FIG. 1) 103, a display unit (denoted as "DSP" in FIG. 1) 104, and an operation-state-memory clearing interface (denoted as "CLR-I/F" in FIG. 1) 105.

The control unit 101 is for executing a recovery control as will be described later, and such a control unit 101 may specifically be implemented by, for example, a microcomputer and software. In the embodiment of the invention, this control unit 101 incorporates a recovery control routine, which will be described later with reference to FIGS. 2 through 5, and other general control routines that are necessary for vehicle controlling.

The storage unit 102 stores various data and the like. In the embodiment of the invention, it includes an operation state memory 1, a recovery mode memory 2, a recovery memory 3, and a normal operation time memory 4 according to the types of data to be stored. In a later described processing procedure of recovery controlling, an explanation will be given as needed about what kind of data these memories 1 to 4 store.

In addition, although this configuration example illustrates a configuration example in which separate respective memories are provided, it is of course possible to use one single memory divided into four separate sections. Also, for all the memories, it is suitable to use a nonvolatile memory that is capable of retaining stored contents even when a power supply voltage is cut off.

The recovery circuit 103 comprises a counter that is necessary to perform later-described recovery controlling. In the embodiment of the invention, it is provided with two components, a recovery counter 5 and a normal-operation-time timer counter (denoted as "OPE-COUNT" in FIG. 1).

The recovery counter 5 is for enumerating how many times the recovery process was performed and the vehicle control system was recovered.

The normal-operation-time timer counter 6 is for counting a time of a normal operation time of this vehicle control system, as will be described later.

It should be noted that although the recovery circuit 103 in the embodiment of the invention is implemented as a hardware component, it is of course possible to implement the recovery circuit 103 by a software component using a publicly-known/well-known counter program in the control unit 101.

The display unit 104 has a publicly-known/well-known configuration for displaying various necessary characters and symbols according to the operation state of this vehicle control system.

The operation-state-memory clearing interface 105 is for erasing all the stored contents in the operation state memory 1. More specifically, it is suitable to use one using an on/off switch so that the contents of the operation state memory 1 are cleared when the switch is turned on, for example.

Next, a processing procedure of the recovery controlling executed by the control unit 101 in the foregoing configuration is explained with reference to FIGS. 2 through 5.

Figure 2:
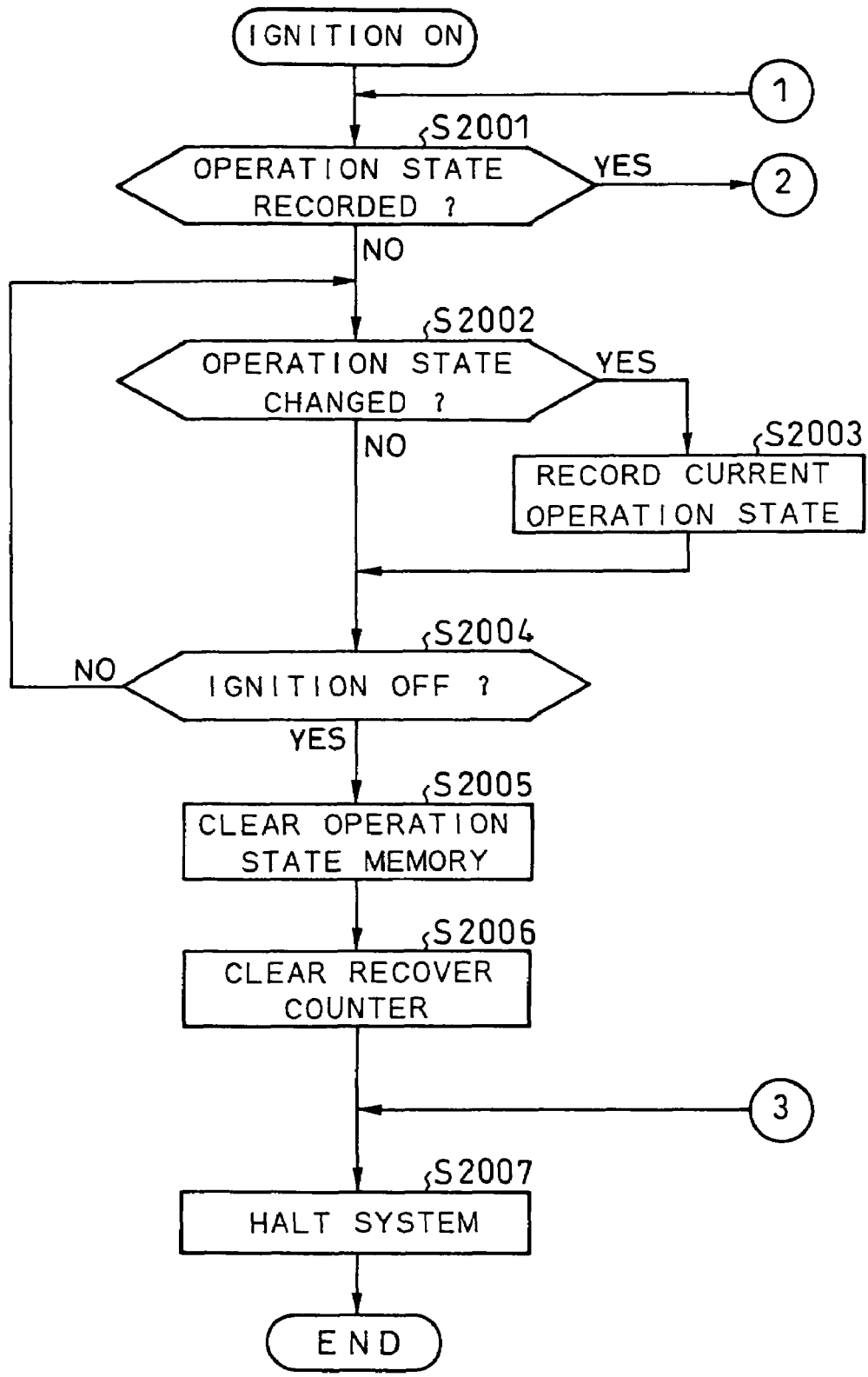
FIG. 2 is a main flowchart illustrating a control process procedure executed during a normal operation time of the vehicle control system shown in FIG. 1.

First, with reference to FIG. 2, the overall control processing procedure of this vehicle control system is explained. FIG. 2 illustrates, in particular, a main routine of the recovery control in the vehicle control system.

Upon starting the process by turning on a ignition switch (not shown) of a vehicle, it is determined first whether or not there is a record of an operation state in the operation state memory 1 (step S2001 in FIG. 2). Here, first of all, the operation state memory 1 in the embodiment of the invention is configured so that an operation state of the vehicle control system immediately before a system reset occurrence is stored therein and, if the system is terminated and halted normally, the state indicating that is written therein.

Accordingly, the judgment on whether or not there is a record of an operation state of the operation state memory 1 immediately after the ignition switch is turned on corresponds to determining whether or not the system operation before the ignition switch has been turned on had been terminated normally.

Then, if it is determined that there is a record of an operation state (if YES) in this step S2001, the flow proceeds to a later-described process of step S3000, because it means that the system was not normally halted and terminated in the previous system operation and a system reset was performed. In other words, in the embodiment of the invention, it is assumed that such a system reset is performed because a power supply anomaly has been occurred.

On the other hand, if it is determined that there is no record of operation state (if NO) in step S2001, the counting of the normal-operation-time timer counter 6 starts and the flow proceeds to the next process of step S2002 because it means that the system has been halted and terminated normally in the previous system operation. It should be noted that, in the embodiment of the invention, when the counting of the normal-operation-time timer counter 6 starts, the count values that change every moment are sequentially written into the normal operation time memory 4. In addition, the normal-operation-time timer counter 6 is configured so as to halt inevitably when a power supply anomaly occurs.

Next, in step S2002, it is determined whether or not there is a change of operation states.

Specifically, first, the operation states of a vehicle herein means such states as "an idle state," "an acceleration state," "a cruise state," "an engine operation state by limp home," and further "an engine halt state by recovery." A change of operation states means a change from a certain operation state into another operation state, among those listed as examples.

Then, if it is determined that there is a change of operation states (if YES) in step S2002, the changed operation states are stored in the operation state memory 1 (step S2003 in FIG. 2), and the flow proceeds to the next process of step S2004; on the other hand, if it is determined that there is no change of operation states (if NO) in step S2002, a general process necessary in a normal operation of the vehicle system is executed although not shown in the figure, and subsequently the flow proceeds to the process of step S2004.

In step S2004, it is determined whether or not the ignition switch, which is not shown in the figure, has been turned off, and until it is determined that the ignition switch has been turned off, the foregoing process that follows step S2002 is repeated. Then, in step S2004, if the ignition switch has been turned off (if YES), a halt preparation process that is necessary for halting the system operation is performed, although it is not shown in the figure. Subsequently, the stored data in the operation state memory 1 are erased, and a predetermined state indicating that the system has been halted normally is written into the operation state memory 1 (cf step S2005 in FIG. 2).

Subsequently, the recovery counter 5 is cleared (step S2006 in FIG. 2), and the system is halted (cf. step S2007 in FIG. 2), completing a series of processes.

Next, a process that is performed if it is determined that there is a record of an operation state in the operation state memory 1 in the previously-described step S2001 (if YES) is explained with reference to FIGS. 3 and 5.

Figure 3:
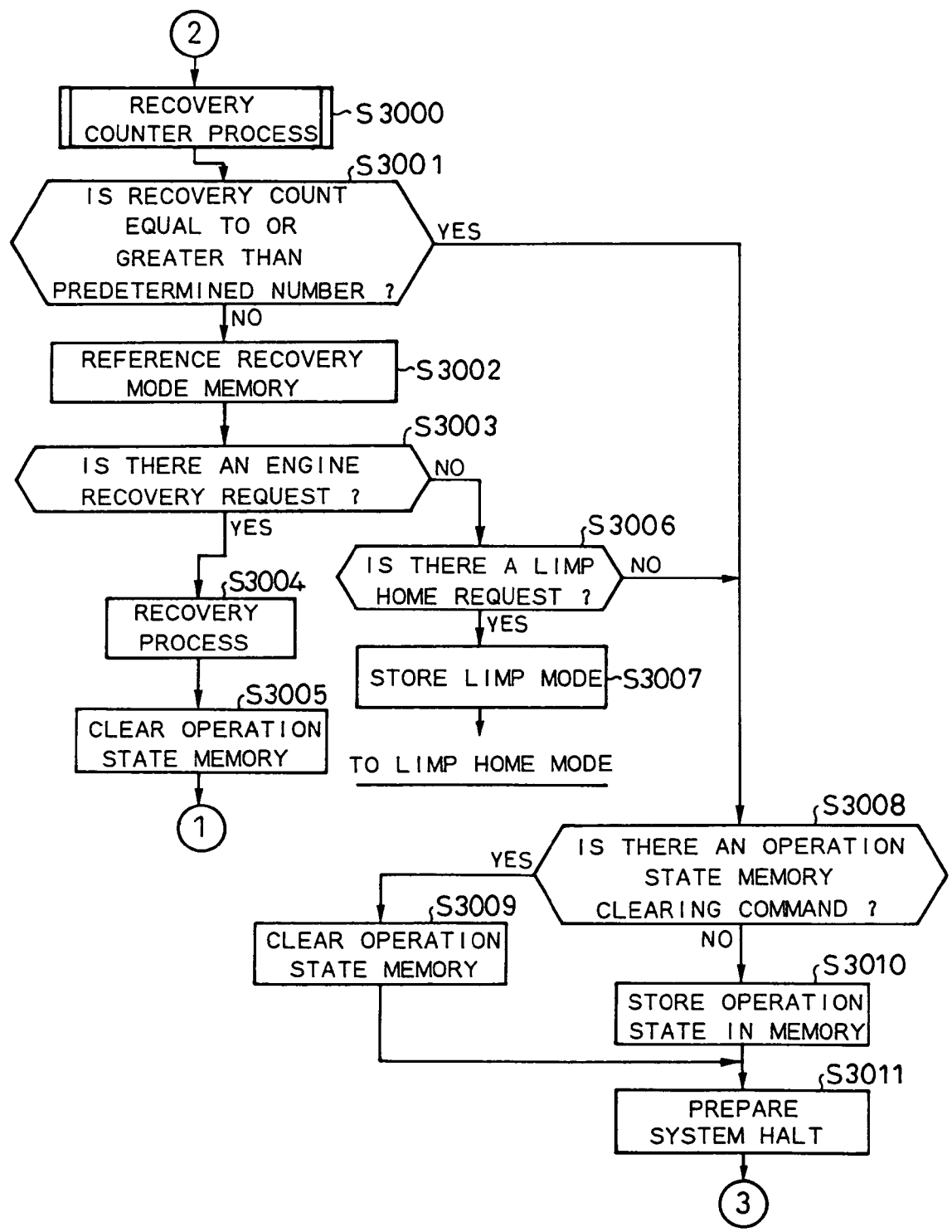
FIG. 3 is a flowchart illustrating a control procedure in the case where a recovery process is performed in the vehicle control system shown in FIG. 1.

First, a recovery counter process is performed (step S3000 in FIG. 3). This recovery counter process is a sub-routine process in which an enumerated value of the recovery counter is weighted according to the condition of power supply voltage anomaly in the vehicle control system, the details of which are illustrated in FIG. 4.

Hereinbelow, this recovery counter process is explained with reference to FIG. 4.

Figure 4:
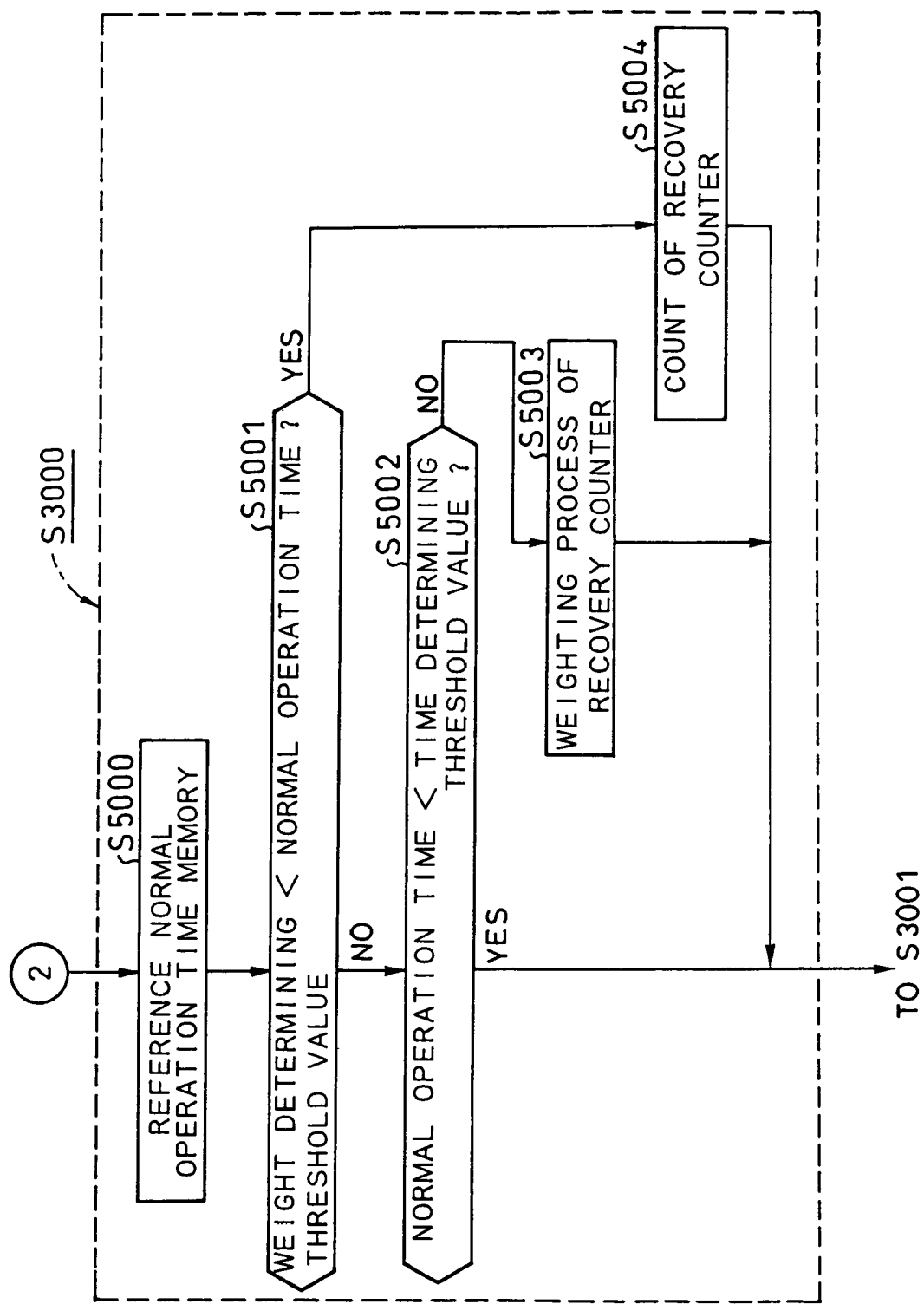
FIG. 4 is a flowchart illustrating a specific processing procedure of the recovery counter process shown in FIG. 3.

Upon starting the recovery counter process, the stored contents in the normal operation time memory 4 are referenced first (step S5000 in FIG. 4). Here, the normal time operation memory 4 stores a time indicating how long the system had been operating normally until the system reset occurred.

Then, the normal operation time stored in the normal operation time memory 4 is read out, and it is determined whether or not the normal operation time is greater than a weight determining threshold value (a first reference value) (step S5001 in FIG. 4).

Figure 5:
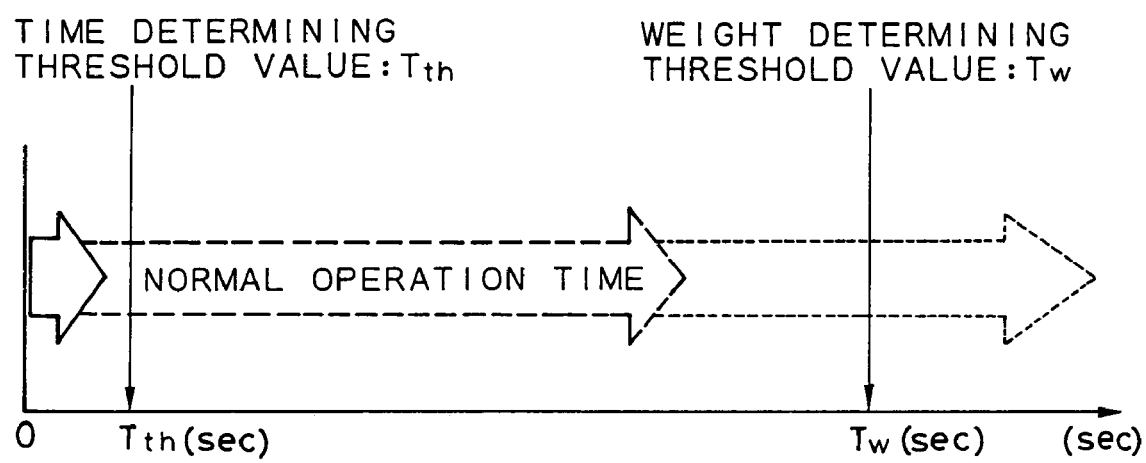
FIG. 5 is an explanatory view for illustrating a normal operation time, a time determining threshold value, and a weight determining threshold, in a vehicle control system according to an embodiment the invention.

Here, an explanation is given concerning the normal operation time, the weight determining threshold, and a next-described time determining threshold value in step S5002 in the embodiment of the invention with reference to FIG. 5.

In FIG. 5, the horizontal axis is a time axis, which represents an elapsed time from the start of the system, in other words, from the start of the enumeration by the normal-operation-time timer counter 6 (at the point of time "0" in FIG. 5).

The "time determining threshold value" (Tth) is a time point at which a relatively short time has elapsed from the start of the system. It is preferable that this time determining threshold value (a second reference value) is determined based on experimental values in an actual vehicle control system or simulations. In the embodiment of the invention, a power supply anomaly that occurs within a relatively short time from the start of the system is taken as a standard among a variety of power supply anomalies, and an average time in the case where such a power supply anomaly is set as the time determining threshold value.

In addition, the "weight determining threshold value" (Tw) is a time determined based on experimental values in an actual vehicle control system or simulations taking a power supply anomaly that occurs suddenly after the system had been operating normally for a long time as a standard.

In the embodiment of the invention, a time from the start of the system until a recovery process is performed due to a power supply anomaly is defined as a normal operation time.

Here, the discussion returns to the explanation of FIG. 4. If it is determined that the normal operation time is greater than the weight determining threshold value (if YES) in step S5001, enumeration is performed in the recovery counter 5, wherein the enumerated value is advanced by "1" and "1" is added to the stored value in the recovery memory 3; then, the flow proceeds to the later-described process of step S3001 (FIG. 3) (step S5004 in FIG. 4). Here, the recovery memory 3 is a memory for storing the number of occurrences of the recovery process.

On the other hand, if it is determined that the normal operation time is not greater than the weight determining threshold value (if NO) in step S5001, it is determined whether or not the normal operation time is less than the time determining threshold value (step S5002 in FIG. 4). If it is determined that the normal operation time is less than the time determining threshold value (if YES), the flow proceeds to the later described process of step S3001 (FIG. 3) without advancing the enumerated value of the recovery counter 5. On the other hand, if it is determined that the normal operation time is not less than the time determining threshold value (if NO), in other words, if the normal operation time is greater than the time determining threshold value but less than the weight determining threshold value, the flow proceeds to the process of step S5003.

It should be noted here that normal operation time<time determining threshold value holds when, for example, power supply anomalies occur periodically in a very short time but the power supply anomalies resolve as soon as the engine starts to operate, such as when the engine is started at a low temperature, and it is preferable that the time determining threshold value should be set taking the cycle time of occurrence of power supply anomalies in such cases as a standard.

In step S5003, a weighting process of the recovery counter 5 is performed. That is, the weighting process is a process in which the enumerated value of the recovery counter 5 is advanced further than usual according to a predetermined criterion, from the viewpoint that such a power supply anomaly that the normal operation time falls between the time determining threshold value and the weight determining threshold value is undesirable. Specifically, the following process methods are suitable. Where an enumerated value at one time should be set at "1" normally, the enumerated value at one time may be set at a predetermined value of "two" or greater, or the enumerated value of the recovery counter 5 immediately before the weighting process may be multiplied by a predetermined coefficient.

Then, while the weighting process of the recovery counter 5 is performed, "1" is added to the stored value in the recovery memory 3 at the same time, and the flow proceeds to the later-described process of step S3001 (FIG. 3).

Next, the discussion returns to the description of the previously-mentioned FIG. 3. After the recovery counter process is performed, it is determined whether or not the number of counts (the enumerated value) of the recovery counter 5 is equal to or greater than a prescribed number (step S3001 in FIG. 3). If it is determined that the value is equal to or greater than the prescribed number (if YES), the flow proceeds to the process of step S3008. On the other hand, if it is determined that the value does not exceed the prescribed number (if NO), the flow proceeds to the process of step S3002.

First, an explanation is given about the case in which it is determined that the number of counts of the recovery counter 5 does not exceed a prescribed number. In this case, the flow proceeds to step S3002, and the content of the recovery mode memory 2 is referenced. Here, the information on the previously-described recovery mode according to the operation state that has been written into the operation state memory 1 is written into the recovery mode memory 2. That is, there are a variety of operation states of the system immediately before the system reset, naturally, and which of the recovery modes is used to recovery the system in the recovery process depends on the operation state immediately therebefore. Therefore, in the embodiment of the invention, when an operation state is written into the operation state memory 1, a recovery mode determined according to the operation state that has been written into the operation state memory 1 is written into the recovery mode memory 2.

Next, it is determined whether or not the recovery mode written into the recovery mode memory 2 requests recovery of the engine (step S3003 in FIG. 3). If it is determined that there is an engine recovery request (if YES), a process necessary for the engine recovery is performed (step S3004 in FIG. 3), and the content in the operation state memory 1 is cleared. Meanwhile, the state indicating that the system has been halted normally is written, and the flow returns to the previously-described process of step S2001 in FIG. 2 (step S3005 in FIG. 3).

On the other hand, if it is determined that there is no engine recovery request (if NO) in step S3003, it is determined whether or not there is a limp home request by referencing the stored content in the recovery mode memory 2 (step S3006 in FIG. 3). It should be noted that the limp home is a publicly-known/well-known function for enabling a vehicle to be operated to a nearby garage in the case of failure, and therefore, detailed explanation thereof will not be given herein.

Then, if it is determined that there is no limp home request (if NO) in step S3006, the flow proceeds to the process of step S3008. On the other hand, if it is determined that there is a limp home request (if YES), the fact that the operation state of the system is in a limp home mode is stored in the operation state memory 1, and a limp home mode process, which is not shown in the figure, is performed. In addition, the display unit 104 indicates that the system has entered a limp home mode.

Next, if it is determined as YES in the previous step S3001, or if it is determined as NO in step S3006, it is determined whether or not there is a request for clearing the operation state memory 1 from outside; specifically, for example, it is determined whether or not a request for clearing the operation state memory 1 is made by the operation-state-memory clearing interface 105 (step S3008 in FIG. 3). If it is determined that there is a clear request (if YES), the operation state memory 1 is cleared. Meanwhile, the state indicating that the system has been halted normally is written therein, and the flow proceeds to the later-described process of step S3011.

On the other hand, if it is determined that there is no request for clearing the operation state memory 1 (if NO) in step S3008, the information indicating that the system is in a halt state due to recovery is written into the operation state memory 1 (step S3010 in FIG. 3).

Next, a preparation for a system halt is performed (step S3011 in FIG. 3), and thereafter, the flow proceeds to step S2007 shown in FIG. 2, in which the system is halted. Here, examples of the preparation for halting the system halt include such processes as resetting peripheral control circuits, which are not shown in FIG. 1, and bringing the process into an endless routine to prevent the CPU from running away. In addition, the display unit 104 indicates that the system is halted at this time.

The invention can be applied to an electronic control apparatus for performing operation control of a vehicle, and is especially suitable for an apparatus in which such a control is desired that a system termination is not performed immediately at only one time of power supply anomaly occurrence.

The invention employs a configuration in which an operation state immediately before a system reset is performed because of a power supply anomaly and a recovery mode according to the operation state are stored, and the stored content can be referenced at the time of a recovery process; thereby, an accurate recovery process can be performed quickly according to the operation state before the recovery.

Moreover, by employing a configuration in which an anomaly that triggers a recovery process to be executed is monitored with its frequency of occurrence and time of occurrence, the following advantages are attained. It becomes possible to avoid an immediate system halt for a power supply anomaly that occurs, for example, periodically at the time of starting the engine at a low temperature, and to select a system halt or the like at an appropriate time, thus enabling flexible controlling.

What is claimed is:

1. A control method for a vehicle control system, the method comprising:

storing, if a system reset occurs, an operation state of the vehicle control system immediately before the system reset, and storing a recovery mode that corresponds to the operation state of the vehicle control system immediately before the system reset;

referencing the stored content at a start of the vehicle control system;

performing a recovery process based on the stored recovery mode if a recovery process is to be performed;

enumerating and storing a normal operation time that is measured from a start of the vehicle control system until the system reset occurs;

determining whether or not the stored normal operation time is greater than a first reference value;

performing enumeration by a recovery counter if it is determined that the stored normal operation time is greater than the first reference value;

determining whether or not the enumerated value of the recovery counter is equal to or greater than a preset value; and terminating the vehicle control system if it is determined that the enumerated value of the recovery counter is equal to or greater than the preset value.

2. The control method for a vehicle control system as set forth in claim 1, further comprising:

determining whether or not the stored normal operation time is less than a second reference value if it is determined that the stored normal operation time is less than the first reference value; and performing enumeration by a recovery counter with a predetermined weight if it is determined that the stored normal operation time is not less than the second reference value.

* * * * *